(12) United States Patent
Hsieh et al.

(10) Patent No.: US 10,848,691 B2
(45) Date of Patent: Nov. 24, 2020

(54) SYSTEM FOR OBSERVING NOCTURNAL ACTIVITIES AND TEMPERATURE VARIATION OF A LIVING TARGET DURING DAYTIME

(71) Applicants: Chi-Sheng Hsieh, Hsinchu (TW); Pao-Chyuan Chen, Zhubei (TW)

(72) Inventors: Chi-Sheng Hsieh, Hsinchu (TW); Pao-Chyuan Chen, Zhubei (TW)

( * ) Notice: Subject to any disclaimer, the term of this patent is extended or adjusted under 35 U.S.C. 154(b) by 0 days.

(21) Appl. No.: 16/711,312

(22) Filed: Dec. 11, 2019

(65) Prior Publication Data
US 2020/0120294 A1  Apr. 16, 2020

Related U.S. Application Data

(63) Continuation-in-part of application No. 15/923,824, filed on Mar. 16, 2018, now abandoned.

(30) Foreign Application Priority Data

Jul. 12, 2017  (TW) .............................. 106123267 A

(51) Int. Cl.
*H04N 5/00* (2011.01)
*H04N 5/33* (2006.01)
(Continued)

(52) U.S. Cl.
CPC ................ *H04N 5/332* (2013.01); *G01J 5/20* (2013.01); *H04N 7/18* (2013.01); *G01J 2005/0077* (2013.01); *G01J 2005/202* (2013.01)

(58) Field of Classification Search
CPC ............. G01J 3/2803; G01J 2005/0077; G01J 3/0264; G01J 3/36; G01J 5/20; G01J 5/0025; G01J 2005/202; G01J 3/0291; G01J 3/108; H04N 5/332; H04N 7/18; H04N 7/188
See application file for complete search history.

(56) References Cited

U.S. PATENT DOCUMENTS

| 9,367,219 | B2 | 6/2016 | Andersson |
| 2006/0048286 | A1* | 3/2006 | Donato .............. G02B 27/0176 2/422 |

(Continued)

FOREIGN PATENT DOCUMENTS

| TW | I328593 B | 8/2010 |
| TW | I425292 B | 2/2014 |

*Primary Examiner* — Zhihan Zhou
(74) *Attorney, Agent, or Firm* — Hamre, Schumann, Mueller & Larson, P.C.

(57) ABSTRACT

A system is proposed for observing nocturnal activities and temperature variation of a living target during daytime. The system includes an observation box, an imaging device, and a near infrared (NIR) source unit. The observation box allows passage of near infrared, blocks passage of visible light, and contains and covers the living target. The imaging device includes a first image capturing module to capture a thermal image of the observation box using far infrared, and a second image capturing module to capture an image of the observation box using visible light and of the living target using near infrared. The NIR source unit projects near infrared toward the observation box for enhancing near infrared reflected by the living target.

5 Claims, 15 Drawing Sheets
(4 of 15 Drawing Sheet(s) Filed in Color)

(51) Int. Cl.
*G01J 5/20* (2006.01)
*H04N 7/18* (2006.01)
*G01J 5/00* (2006.01)

(56) References Cited

U.S. PATENT DOCUMENTS

| | | | | |
|---|---|---|---|---|
| 2006/0151099 A1* | 7/2006 | Yamamoto | B29C 65/168 | 156/272.8 |
| 2008/0291531 A1* | 11/2008 | Heimer | G02B 13/146 | 359/351 |
| 2011/0228087 A1* | 9/2011 | Hsieh | C08J 3/201 | 348/143 |
| 2012/0183288 A1* | 7/2012 | Kishinami | G02B 13/0085 | 396/505 |
| 2015/0109768 A1* | 4/2015 | Whitmore | F21L 4/022 | 362/184 |
| 2015/0309707 A1* | 10/2015 | Andersson | G06F 3/04845 | 715/765 |
| 2016/0178593 A1* | 6/2016 | Miller | G06T 7/33 | 382/191 |
| 2016/0214534 A1* | 7/2016 | Richards | H04N 13/204 | |
| 2016/0331868 A1* | 11/2016 | Grubbs | A61L 27/047 | |
| 2018/0120435 A1* | 5/2018 | Decker | B32B 33/00 | |

* cited by examiner

SYSTEM FOR OBSERVING NOCTURNAL ACTIVITIES AND TEMPERATURE VARIATION OF A LIVING TARGET DURING DAYTIME

CROSS-REFERENCE TO RELATED APPLICATION

This application is a continuation-in-part (CIP) application of U.S. patent application Ser. No. 15/923,824, filed on Mar. 16, 2018, the contents of which are incorporated herein by reference, and which claims priority of Taiwanese Invention Patent Application No. 106123267, filed on Jul. 12, 2017.

FIELD

The disclosure relates to an observation system, and more particularly to a system for observing nocturnal activities and temperature variation of a living target during daytime.

BACKGROUND

For a long time, observing nocturnal animals, especially nocturnal insects, has been an important activity in biology education courses. However, conducting observation activities at nighttime may be dangerous and inconvenient for students, especially when taken place in the wild, such as in a forest. Therefore, an idea of using an opaque plastic box to create a darkroom that simulates a nocturnal environment has been proposed.

Although using the opaque plastic box facilitates safe and convenient observations of nocturnal insets, it brings some other problems, such as how an observer can determine whether an insect in the darkroom is still alive or not. To solve this problem without eliminating the use of the opaque plastic box, observations may be conducted using a conventional thermographic camera because objects with temperatures over 0 K (zero kelvins) will emit invisible electromagnetic radiations (heat radiations) in the far infrared (FIR) range (roughly between 8 µm and 14 µm in terms of wavelength), and the intensity of the FIR radiation is a function of and is positively correlated to the temperature of the object. Conventional thermographic cameras use a lens unit in cooperation with a focal plane array (FPA) that is sensitive in a spectrum of far infrared to convert radiation from the objects into electric signals, followed by using a processor module to calculate temperature values corresponding to the electric signals, and perform image processing based on the calculated temperature values to generate, on a screen, a visible FIR thermal image (thermography) in which different pseudo colors are used to represent different temperature values. Accordingly, even if an object, which has a relatively high temperature (e.g., an animal), is hidden in the dark, it can still be easily seen in the FIR thermal images captured by the infrared, thermographic cameras.

However, the heat radiation from some insects are so weak that it cannot penetrate the opaque plastic box, and in such case, the conventional thermographic cameras are unable to directly detect the insects inside the opaque plastic box, and can only detect temperature variations at the outer surface of the opaque plastic box, which may result from heat that is transmitted from the insects inside the opaque plastic box to the outer surface via heat radiation and/or conduction. When heat provided by an insect cannot cause enough temperature variation on the outer surface of the opaque plastic box (an exemplary case is that the insect is not nearby the walls of the opaque plastic box), the conventional thermographic cameras may not be able to obtain a thermal image showing presence of the insect, and an observer may make a misjudgment that the insect is dead. Even if a thermal image showing presence of the insect is successfully acquired, the insect shown in such an FIR thermal image is usually vague since the FIR thermal image only shows differences in temperature, and details of the insect, like the silhouette of the insect, are hardly discernible.

Referring to FIG. 1, some companies, such as FLIR systems Inc., Fluke Corporation, etc., proposed a thermographic camera 100 with a dual-lens structure, like FLIR ONE®, that includes, in addition to a lens unit 11 and an FPA 13 which are included in the conventional thermographic cameras, another lens unit 12 and an image sensor 14 (e.g., a CCD sensor, a CMOS sensor, etc.) that cooperatively capture visible light (VIS, approximately between 0.38 µm and 0.78 µm, or between 0.4 µm and 0.8 µm in terms of wavelength) to generate a visible-light image, followed by performing image fusion (a conventional technique to combine images of the same scene, which are captured in different conditions, such as under different capturing modes, at different capturing times, etc., so as to generate a fusion image that contains desired information which may originally be dispersed amongst different captured images) on the FIR thermal image and the visible-light image. Accordingly, details of the scene being captured, which may be acquired from the visible-light image, can be added to the FIR thermal image to form the fusion image, improving the image quality. However, near infrared, which ranges generally between 0.8 µm and 1.0 µm in terms of wavelength, may also pass through the lens unit 12. If near infrared reaches the image sensor 14, the resultant image may become reddish. In order to approach the true colors (i.e., the colors as perceived by human eyes) of the scene in the resultant image when such conventional dual-lens camera is used as an ordinary camera (i.e., merely acquiring the visible-light image), an infrared cut filter (ICF) 19 is placed between the lens unit 12 and the image sensor 14 for filtering out the near infrared in order to ensure image quality.

Further referring to FIG. 2, the electromagnetic waves provided by a to-be-captured object are exemplified to have a spectrum 21, which may result from reflection of sunlight that passes through the infrared atmospheric window, and which illustrates intensity distribution of the electromagnetic waves in terms of wavelength, where a wavelength range of between 1 µm and 8 µm (e.g., a gray colored part in the spectrum 21) is omitted since such a range is irrelevant in the context of this disclosure, and wavelength ranges of "VIS+NIR" (VIS: visible light; NIR: near infrared) and "FIR" are not plotted in the same scale for convenience of plotting the drawing. The first lens unit 11 may filter out electromagnetic waves that are outside of the FIR spectrum, so the electromagnetic waves are exemplified to have the spectrum 22 after passing through the first lens unit 11. The second lens unit may filter out electromagnetic waves that are outside of both of the VIS spectrum and the NIR spectrum, so the electromagnetic waves are exemplified to have the spectrum 23 after passing through the second lens unit 12. The ICF 19 receives the electromagnetic waves that pass through the second lens unit 12, and filters out the electromagnetic waves that are in the NIR spectrum, so that the electromagnetic waves passing through the ICF 19 are exemplified to have the spectrum 24.

FIGS. 3 through 5 show images captured using the conventional thermographic camera 100, and the to-becaptured object includes an empty first cup on the left side and a second cup filled with hot water on the right side. FIG. 3 shows nine fusion images (including both the visible-light image part and the thermal image part) that are generated according to different pseudo color modes P1-P9, from which a user can select a desired representation. In FIG. 4, the FIR thermal image depicted in FIG. 3 under the pseudo color mode P1 is shown in bigger scale. It can be seen in FIG. 4 that a thermal image P1B of the first cup has a color similar to that of a thermal image P1A of the background and is thus unclear because a temperature of the empty first cup is close to room temperature. On the other hand, a thermal image P1C of the second cup has a color quite different from that of the thermal image P1B. By merely comparing the thermal images P1B and P1C, a user can only know that the two cups are of different temperatures, but cannot know what are inside the two cups. FIG. 5 shows the FIR thermal image depicted in FIG. 3 under the pseudo color mode P5, enlarged. In FIG. 5, the thermal image P5B of the first cup is clearer in comparison to the thermal image P1P in FIG. 4 and the thermal image P5B1 of a handle of the first cup is quite distinguishable from the thermal image P5B2 of a cup body of the first cup because of different pseudo color combinations. In each of the FIR thermal images shown in FIG. 3, it can be seen that there is a difference in temperature between the two cups; however, the reason that induces such difference cannot be clearly identified from the images, and the edge of a bottom of the second cup (e.g., the thermal image P5C1 in FIG. 5) is blurry because the heat of the hot water may be conducted to, for example, a tabletop on which the second cup is placed through the bottom of the second cup.

However, when such conventional dual-lens thermographic camera 100 is used in a completely dark environment or a target to be captured by the camera 100 is covered by the opaque plastic box, the image sensor 14 will become useless, and the image thus captured may only include the FIR thermal image part, and is unable to show details of the target. In the case that a to-be-captured insect is inside the opaque plastic box and is not nearby the walls of the opaque plastic box, the image captured by the conventional dual-lens thermographic camera 100 may only include the outer appearance of the opaque plastic box, and one would not be able to know a state of the insect inside the opaque plastic box.

SUMMARY

Therefore, an object of the disclosure is to provide a system that can alleviate at least one of the drawbacks of the prior art.

According to the disclosure, the system for observing nocturnal activities and temperature variation of a living target during daytime is provided to include an observation box, an imaging device, and a near infrared (NIR) source unit. The observation box allows passage of near infrared, and blocks passage of visible light. The living target is disposed within and is covered by the observation box. The imaging device includes a first image capturing module and a second image capturing module. The first image capturing module includes a focal plane array (FPA) that is sensitive to far infrared (FIR) resulting from heat energy of objects, wherein said first image capturing module is disposed to capture a first image, which is a thermal image resulting from far infrared emitted by an outer surface of the observation box. The outer surface of the observation box has a temperature distribution that relates to the living target covered by the observation box. A spectrum of far infrared ranges between 8 μm and 14 μm in terms of wavelength. The second image capturing module includes a filter component that is configured to permit passage of only visible light and light components of which wavelengths fall within a specific range of near infrared, and an image sensor that is sensitive to visible light and near infrared (NIR). The second image capturing module is configured to make the image sensor to receive visible light and near infrared that enter the second image capturing module and that pass through the filter component, and is disposed to capture a second image including a first image component and a second image component. The first image component results from visible light that passes through the filter component, and relates to an outer appearance of the observation box. The second image component results from near infrared that passes through the filter component, and relates to the living target covered by the observation box. A spectrum of visible light ranges between 0.4 μm and 0.7 μm in terms of wavelength, a spectrum of near infrared ranges between 0.7 μm and 1 μm in terms of wavelength, and the specific range of near infrared is selected from the group consisting of a range from 830 nm to 870 nm, a range from 920 nm to 960 nm, and a combination thereof. The NIR source unit is disposed to project near infrared that falls within the specific range of near infrared toward the observation box that covers the living target for enhancing near infrared reflected by the living target, such that the near infrared projected by the NIR source unit passes through the observation box, and is reflected by the living target to the second image capturing module to form the second image component of the second image. The NIR source unit includes a dimmer that is operable to adjust an intensity of near infrared projected by the NIR source unit, so as to change a ratio of intensity of visible light that enters the second image capturing module to intensity of near infrared that enters the second image capturing module.

In one example, the living target includes a nocturnal animal.

In one example, the living target includes a nocturnal insect.

In one example, the second image component becomes clearer in the second image when the dimmer is operated to increase an intensity of near infrared projected by the NIR source unit.

In one example, the imaging device further includes a processor configured to perform image fusion on the first and second images to generate a fusion image that shows the temperature distribution of the outer surface of the observation box, and the living target in the observation box.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Other features and advantages of the disclosure will become apparent in the following detailed description of the embodiments) with reference to the accompanying drawings, of which.

DETAILED DESCRIPTION

Figure 1:
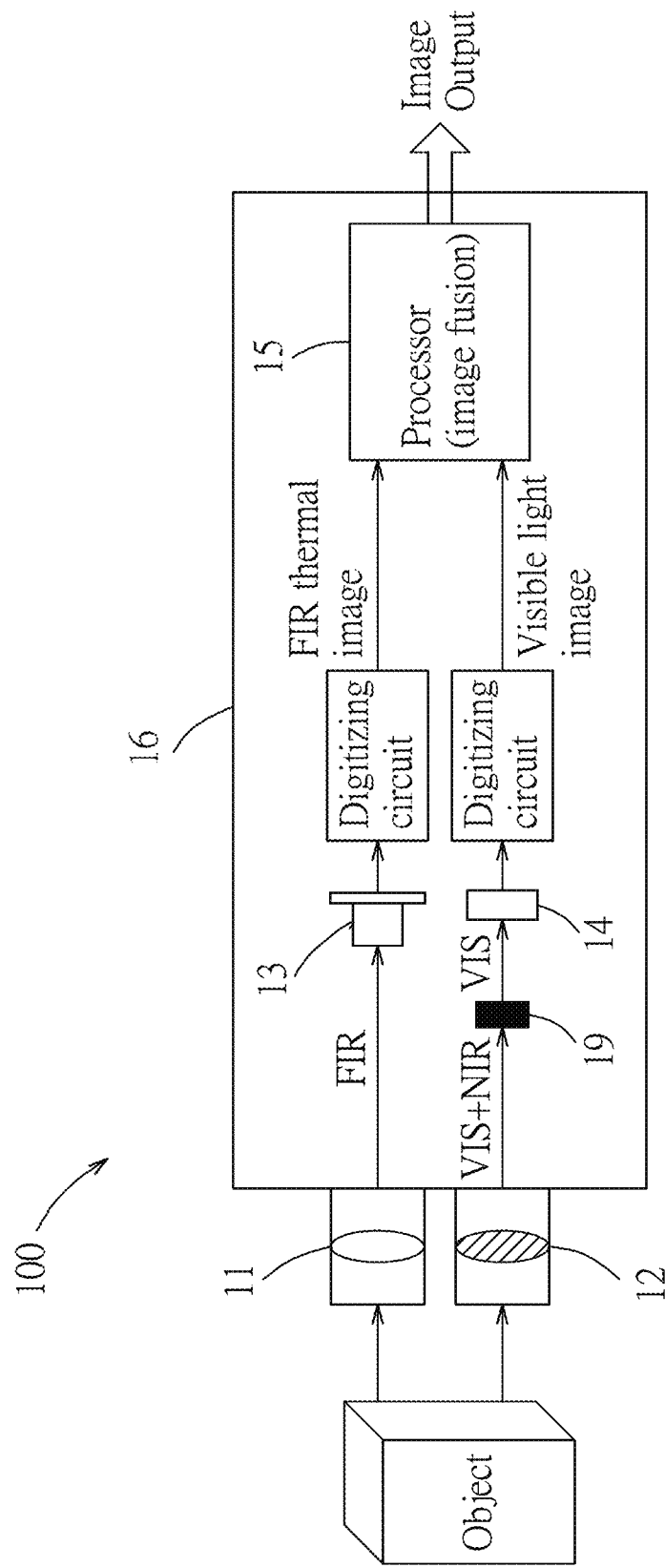
FIG. 1 is a block diagram illustrating a conventional thermographic camera.
Figure 2:
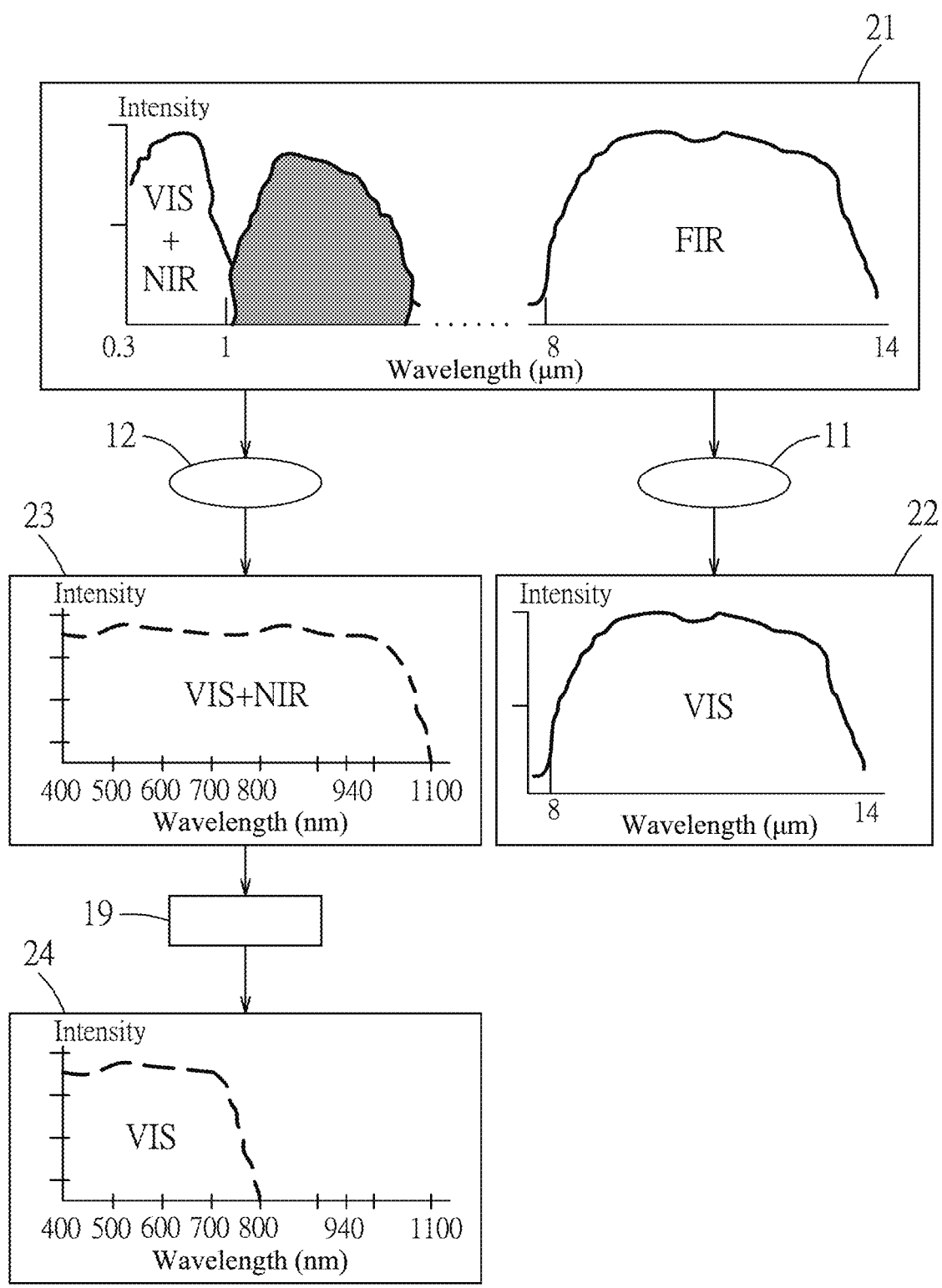
FIG. 2 is a schematic diagram illustrating variations in spectrum of electromagnetic waves that enter the conventional thermographic camera.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 6:
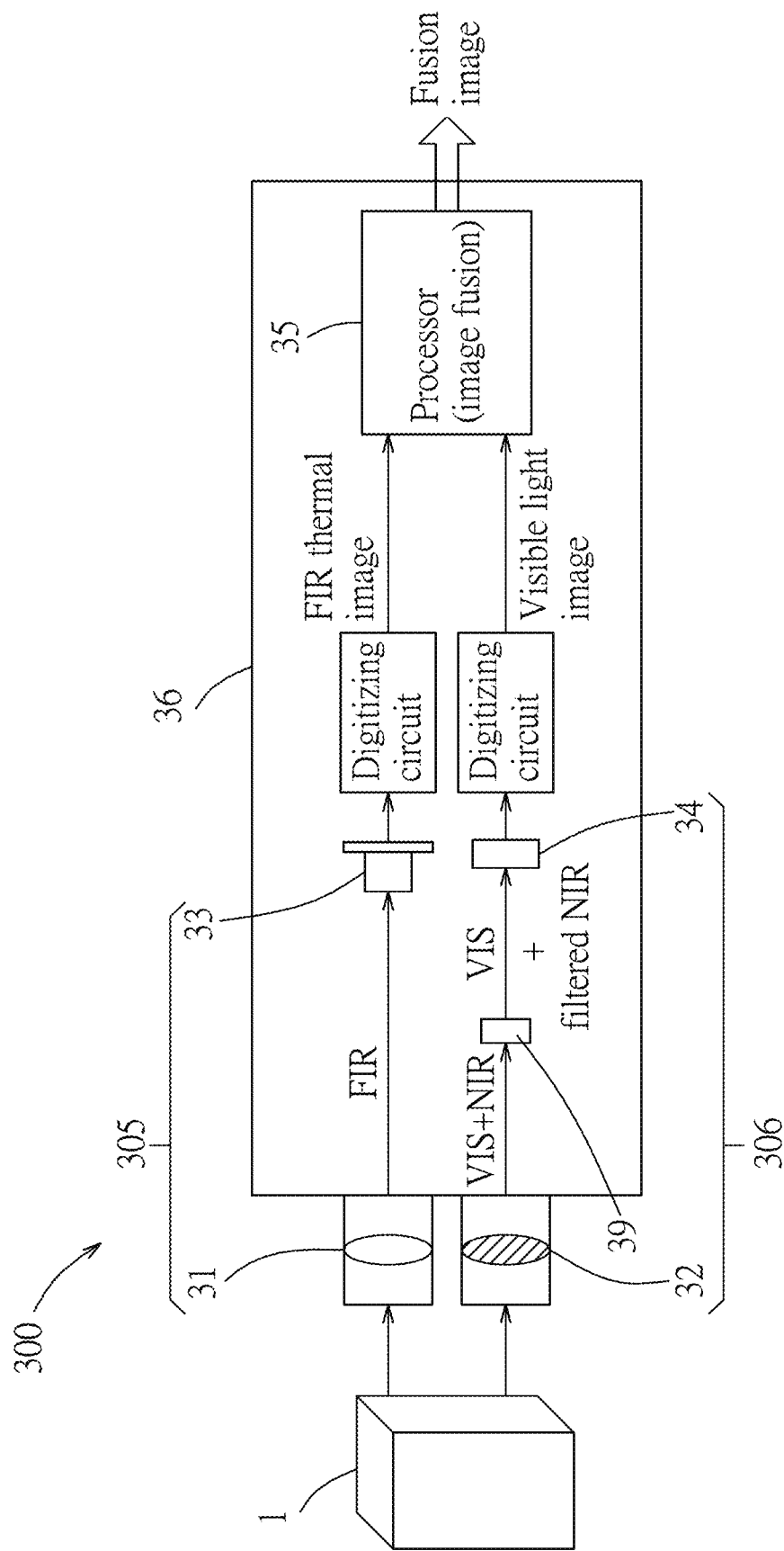
FIG. 6 is a block diagram illustrating an embodiment of a system for observing nocturnal activities of a living target according to this disclosure.
Figure 7:
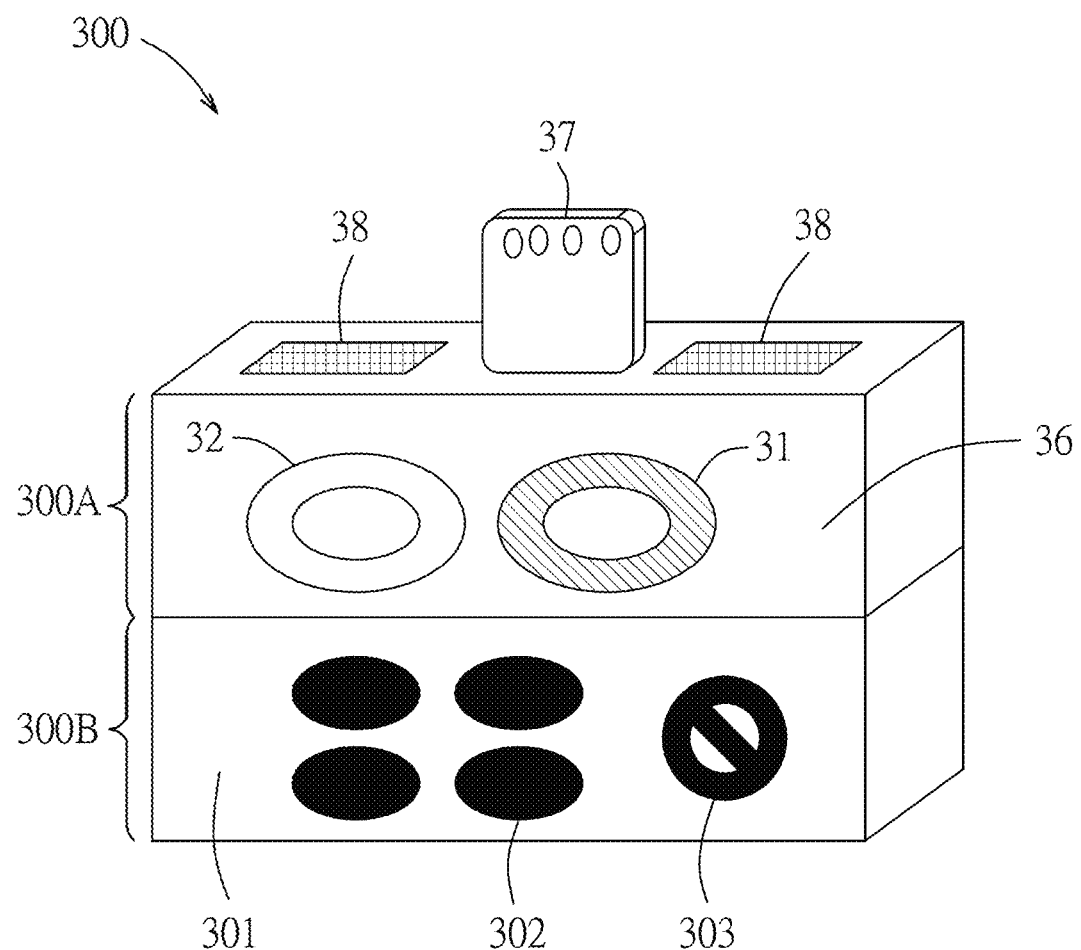
FIG. 7 is a perspective view illustrating the embodiment.
Figure 8:
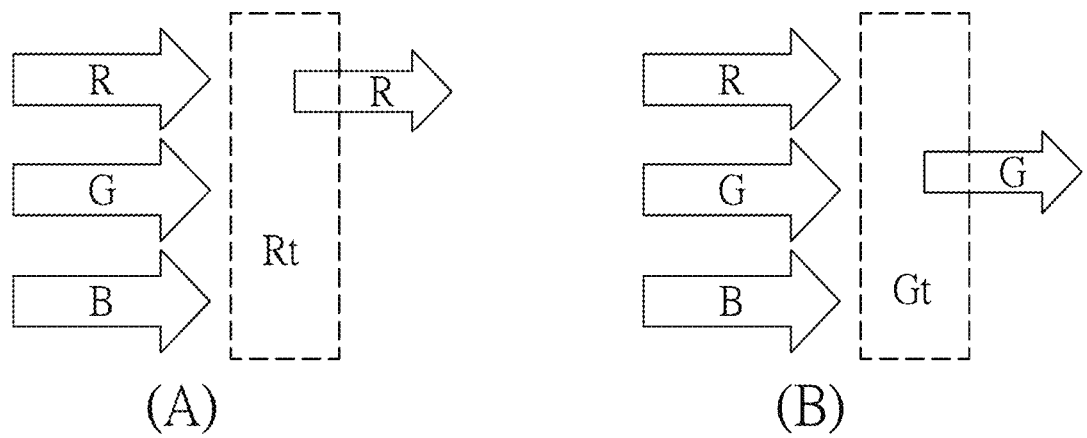
FIG. 8 includes schematic diagrams (A)-(E) illustrating an implementation of an opaque material used to construct an observation box of the embodiment which is suitable for secretly observing a living target.
Figure 8:
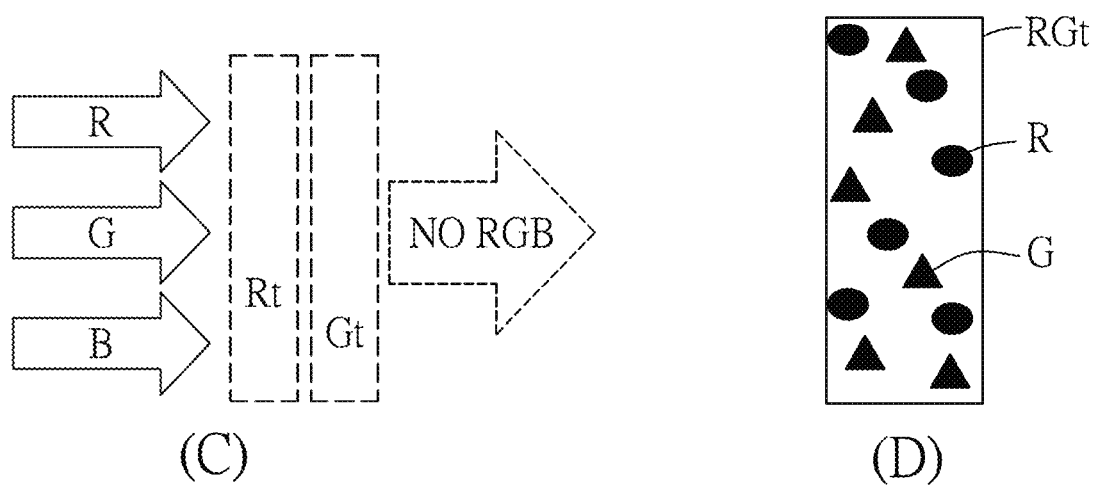
Figure 8:
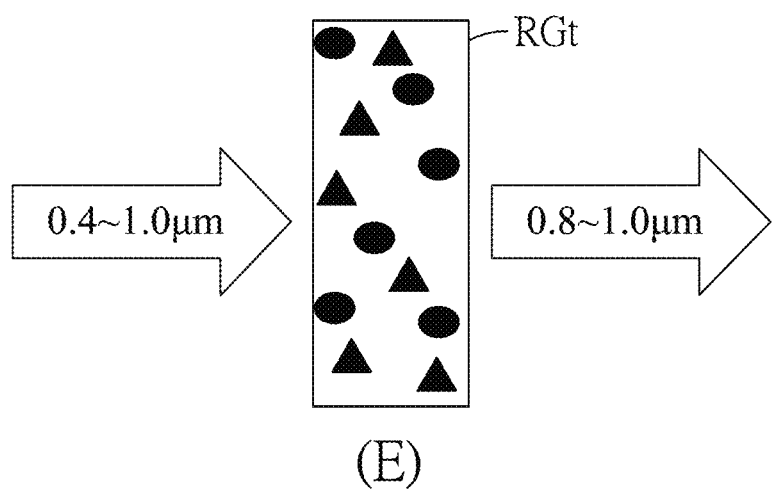
Figure 13:
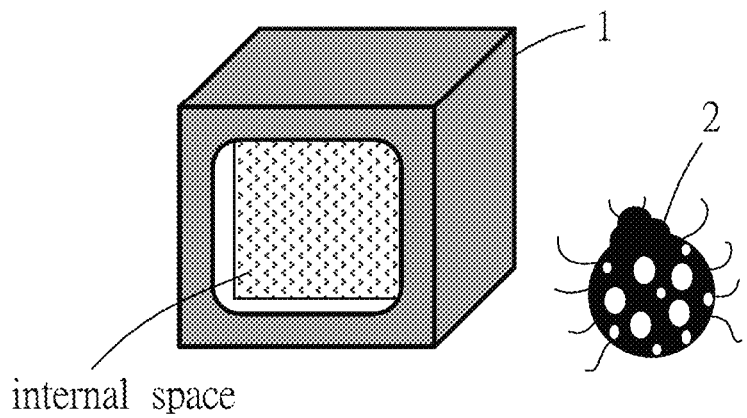
FIGS. 13-18 are schematic diagrams illustrating an exemplary application of the embodiment.

Referring to FIGS. 6 and 7, the embodiment of the system for observing nocturnal activities of a living target (e.g., a nocturnal/fossorial insect, animal or plant, not shown) according to this disclosure is shown to include an imaging device, which is a near infrared (NIR) thermal-imaging camera 300 in this embodiment, and an observation box 1. The NIR thermal-imaging camera 300 includes a camera unit 300A and an NIR source unit 300B attached to the camera unit 300A. The camera unit 300A includes a first lens unit 31, a second lens unit 32, a focal plane array (FPA) 33, an image sensor 34, a processor 35, a filter component 39, and a camera housing 36 to which the components 31-35 and 39 are mounted. The first lens unit 31 and the FPA 33 cooperatively form a first image capturing module 305, which is used to capture images of far infrared that are related to the living target. The second lens unit 32, the filter component 39 and the image sensor 34 cooperatively form a second image capturing module 306, which is used to capture images of visible light and images of near infrared that are related to the living target. The NIR source unit 300B is configured to project near infrared toward the living target, so as to strengthen the near infrared that is reflected by the living target and that is received by the second image capturing module 306, making the images of near infrared clearer. In this embodiment, the NIR source unit 300B uses NIR LEDs to emit near infrared. There are two common types of NIR LEDs in the market. One emits near infrared with a center wavelength of 850 nm, and the other one emits near infrared with a center wavelength of 940 nm. In this embodiment, the NIR thermal-imaging camera 300 is made in a form of a module, which may be a peripheral device of a portable device like a smartphone, a tablet computer, a notebook computer, etc., and have an interface connector (e.g., a lightning or micro USE connector and the like) for connection to the portable device. However, this disclosure is not limited in this respect. The observation box 1 is used to create a dark environment for deceiving the living target 2 (an example is shown in FIG. 13) which is to be placed inside and covered by the observation box 1 that it is nighttime. The observation box 1 is made to allow passage of near infrared and to block passage of visible light. In practice, a ratio between the volume of the living target and the volume of the observation box 1 may range between 1:180 and 1:200. It is noted that the drawings of this disclosure are not drawn to scale for the sake of clarity of illustration. The observation box 1 may be made of a transparent resin (e.g., polymethylmethacrylate (PMMA), polycarbonate (PC), etc.) in which a black material is added. The black material may be a mixture of at least two of three primary color masterbatches (i.e., red color masterbatch, green color masterbatch and blue color masterbatch). Referring to part (A) of FIG. 8, when the red color masterbatch is added into the transparent resin to form a red transparent plate (Rt), the red transparent plate (Rt) only allows passage of red light, while blue light and green light are absorbed thereby. Similarly, referring to part (B) of FIG. 8, when the green color masterbatch is added into the transparent resin to forma green transparent plate (Gt), the green transparent plate (Gt) only allows passage of green light, while blue light and red light are absorbed thereby. Accordingly, referring to part (C) of FIG. 8, when the red transparent plate (Rt) and the green transparent plate (Gt) are used at the same time, almost all of the red light, green light and blue light are absorbed by the combination of the red transparent plate (Rt) and the green transparent plate (Gt), and thus the red transparent plate (Rt) and the green transparent plate (Gt) are capable of serving as an opaque material suitable for making the observation box 1 (see FIG. 6). Referring to part (D) of FIG. 8, when two or more of the primary color masterbatches (e.g., the red color masterbatch (R) and the green color masterbatch (G)) are added into the transparent resin to form an opaque plate (e g., the plate (RGt) in parts (D) and (E) of FIG. 8), and the opaque plate receives electromagnetic waves with wavelengths ranging between 0.4 μm and 1 μm, a part of the electromagnetic waves with wavelengths ranging between 0.4 μm and 0.8 μm will be absorbed by the opaque plate, and only the remaining part of the electromagnetic waves with wavelengths ranging between 0.8 μm and 1 μm can pass through the opaque plate, as shown in part (E) of FIG. 8. Reference may be made to Taiwanese Patent No. I328593 for details of producing the opaque plate using the masterbatches. Accordingly, the opaque plate, which can be used to make the observation box 1, will be nearly transparent in an image formed by NIR (wavelength range falling within the range of from 0.8 μm to 1 μm) (referred to as NIR image hereinafter). In one example, the opaque plate is made of a mixture of carbon black and a transparent resin, and reference may be made to Taiwanese Patent No. I328593 for details of producing such an opaque plate. In one example, the opaque plate includes a transparent resin substrate, and at least one silicon dioxide thin film layer and at least one titanium dioxide thin file layer that are alternately formed/coated on the transparent resin substrate, and reference may be made to Taiwanese Patent Nos. M364878 and M346031 for details of producing such an opaque plate. In such example, the coatings allow passage of the near infrared within a specific wavelength range, and reflect visible light.

Referring to FIG. 6 again, the first lens unit 31 faces toward a target scene (e.g., a scene including the observation box 1 that contains the living target therein) to receive electromagnetic waves from the target scene, and allows passage of at least a portion of the electromagnetic waves received thereby that falls within a spectrum of far infrared (FIR) (e.g., ranging between 8 µm and 14 µm in terms of wavelength).

The second lens unit 32 is disposed adjacent to the first lens unit 31, and faces substantially toward the target scene (so that the scenes viewed through the first and second lens unit 31, 32 may be approximately the same) to receive electromagnetic waves substantially from the target scene, and allows passage of at least a portion of the electromagnetic waves received thereby that falls within a spectrum of near infrared (e.g., ranging between 0.8 µm and 1 µm in terms of wavelength). In this embodiment, the second lens unit 32 allows passage of electromagnetic waves ranging between 0.4 µm and 1 µm in terms of wavelength, where the range between 0.4 µm and 0.8 µm corresponds to a spectrum of visible light (VIS) in terms of wavelength. The first and second lens units 31, 32 are separately disposed and do not overlap each other, so the electromagnetic waves passing through the first lens unit 31 and the electromagnetic waves passing through the second lens unit 32 are independent from each other (i.e., the electromagnetic waves passing through the first lens unit 31 do not subsequently pass through the second lens unit 32, and vice versa).

The filter component 39 is configured to permit passage of only light components of which wavelengths fall within a spectrum of visible light and light components of which wavelengths fall within a spectrum of near infrared projected by the NIR source unit 300B (e.g., 850 nm±20 nm, and/or 940 nm±20 nm). In other words, light components of which wavelengths fall outside of the spectrum of visible light and outside of the spectrum of near infrared projected by the NIR source unit 300B are filtered out by the filter component 39.

Figure 22:
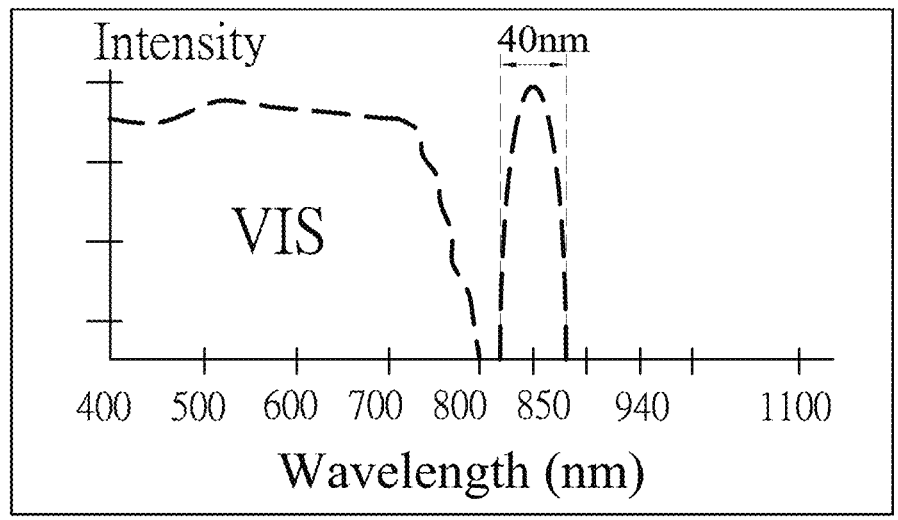
FIGS. 22-24 are plots illustrating spectrums of light passing through different filter components.

FIG. 22 exemplifies a spectrum of light passing through the filter component 39, which is an 850 nm IR pass filter configured to permit passage of only light components of which wavelengths fall within the spectrum of visible light, and light components of which wavelengths fall within a spectrum ranging from 830 nm to 870 nm (850 nm±20 nm).

Figure 23:
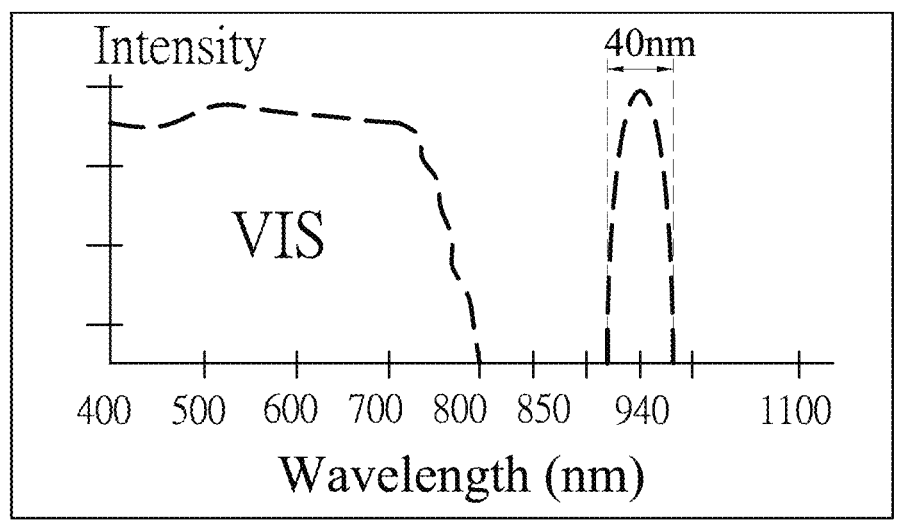

FIG. 23 exemplifies a spectrum of light passing through the filter component 39, which is a 940 nm IR pass filter configured to permit passage of only light components of which wavelengths fall within the spectrum of visible light, and light components of which wavelengths fall within a spectrum ranging from 920 nm to 960 nm (940 nm±20 nm).

Figure 24:
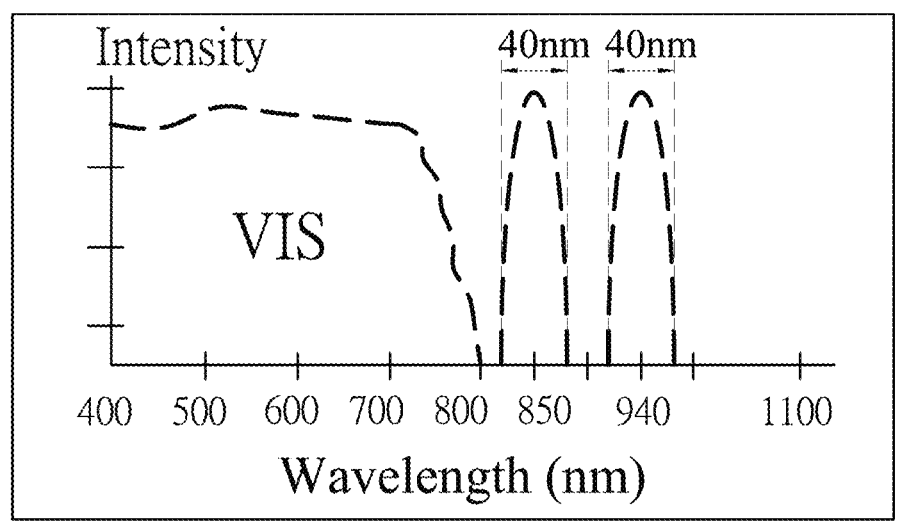

FIG. 24 exemplifies a spectrum of light passing through the filter component 39, which is an IR pass filter configured to permit passage of only light components of which wavelengths fall within the spectrum of visible light, light components of which wavelengths fall within the spectrum ranging from 830 nm to 870 nm, and light components of which wavelengths fall within the spectrum ranging from 920 nm to 960 nm.

The focal plane array 33 is sensitive in the spectrum of far infrared, and is disposed on a focal plane of the first lens unit 31 to receive the electromagnetic waves passing through the first lens unit 31. The focal plane array 33 converts the electromagnetic waves received thereby into image signals that represent a first image (e.g., an FIR thermal image).

The image sensor 34 is sensitive in a spectrum of visible light (may be optional for this disclosure) and a spectrum of near infrared, and is disposed on a focal plane of the second lens unit 32 to receive the electromagnetic waves passing through the second lens unit 32 and the filter component 39. The image sensor 34 converts the electromagnetic waves received thereby into image signals that represent a second image. In this embodiment, the image sensor 34 may receive near infrared light, which may originate from natural light (e.g., sunlight) and/or the NIR source unit 300B and which is reflected by objects in front of the second lens unit 32 (i.e., within a field of view of the NIR thermal-imaging camera 300), thereby generating the image signals that represent the second image. The second image may include a first image component (visible light image) and a second image component (NIR image). The first image component results from visible light that passes through the second lens unit 32 and the filter component 39, and relates to an outer appearance of the observation box 1. The second image component results from near infrared that passes through the second lens unit 32 and the filter component 39, and relates to the living target covered by the observation box 1. The image sensor 34 may be, for example, a charge-coupled device (CCD) sensor, a complementary metal-oxide-semiconductor (CMOS) sensor, etc., but this disclosure is not limited in this respect.

The processor 35 is coupled to the focal plane array 33 and the image sensor 34 for receiving the image signals therefrom, and is configured to perform image fusion on the first and second images to generate a fusion image. The fusion image may show a temperature distribution of an outer surface of the observation box 1 (which relates to the living target covered by the observation box 1) resulting from FIR waves received by the focal plane array 33, with an image of the living target resulting from NIR waves received by the image sensor 34. When the living target is nearby one of the walls of the observation box 1, the fusion image may show, based on the FIR waves, temperature variation on said one of the walls resulting from heat that the living target dissipates, and, based on the NIR waves, the living target in the observation box 1.

In this embodiment, the NIR source unit 300B includes an NIR source housing 301 having the same width and length as the camera housing 36, an infrared source module having a plurality of NIR light sources 302 that emit near infrared, a dimmer 303 operable to adjust intensity of the near infrared emitted by the NIR light sources 302, so as to change a ratio of intensity of visible light that enters the second image capturing module 306 to intensity of near infrared that enters the second image capturing module 306, and a battery (not shown) disposed within the NIR source housing 301 for providing electrical power required by the NIR light sources 302. The infrared source module may be an infrared light emitting diode (LED) module having a plurality of NIR LEDs that serve as the NIR light sources 302, and having a total power of between 1 watt and 5 watts. The dimmer 303 may be realized using a variable resistor or a pulse width modulation (PWN) dimmer, and may include a knob for adjustment by a user. When the dimmer 303 is operated to increase an intensity of near infrared projected by the NIR source unit 300B, the second image component (NIR image) becomes clearer in the second image acquired by the second image capturing module 306. In this embodiment, when the intensity of the near infrared emitted by the NIR light sources 302 is adjusted to a level such that an intensity of the near infrared reflected by the living target is higher than an intensity of the visible light reflected by the living target, the NIR image and not the visible light image would be included in the fusion image; and when the intensity of the near infrared reflected by the living target is lower than the intensity of the visible light reflected by the living target, the visible light image and not the NIR image would be included in the fusion image. As a result, the near infrared and the visible light would not interfere with each other to adversely affect image quality of the fusion image.

It is noted that the near infrared from the sunlight may be relatively weak on cloudy days, rainy days, or in indoor places, so the appearance of the living target in the fusion image, which results from the NIR waves received by the image sensor 34, may become relatively unclear in these situations. Accordingly, the NIR source unit 300B, which is attached to the camera unit 300A, may be used to project near infrared toward the observation box 1, such that the near infrared projected thereby travels into the observation box 1, and is reflected toward the second lens unit 32 by the living target inside the observation box 1. As a result, the near infrared emitted by the NIR source unit 300B may be reflected by the living target, pass through the observation box 1, and be subsequently received by the second lens unit 32, thereby enhancing clarity of the appearance of the living target in the fusion image. It is noted that the living target will not notice the presence of the NIR thermal-imaging camera 300.

Figure 9:
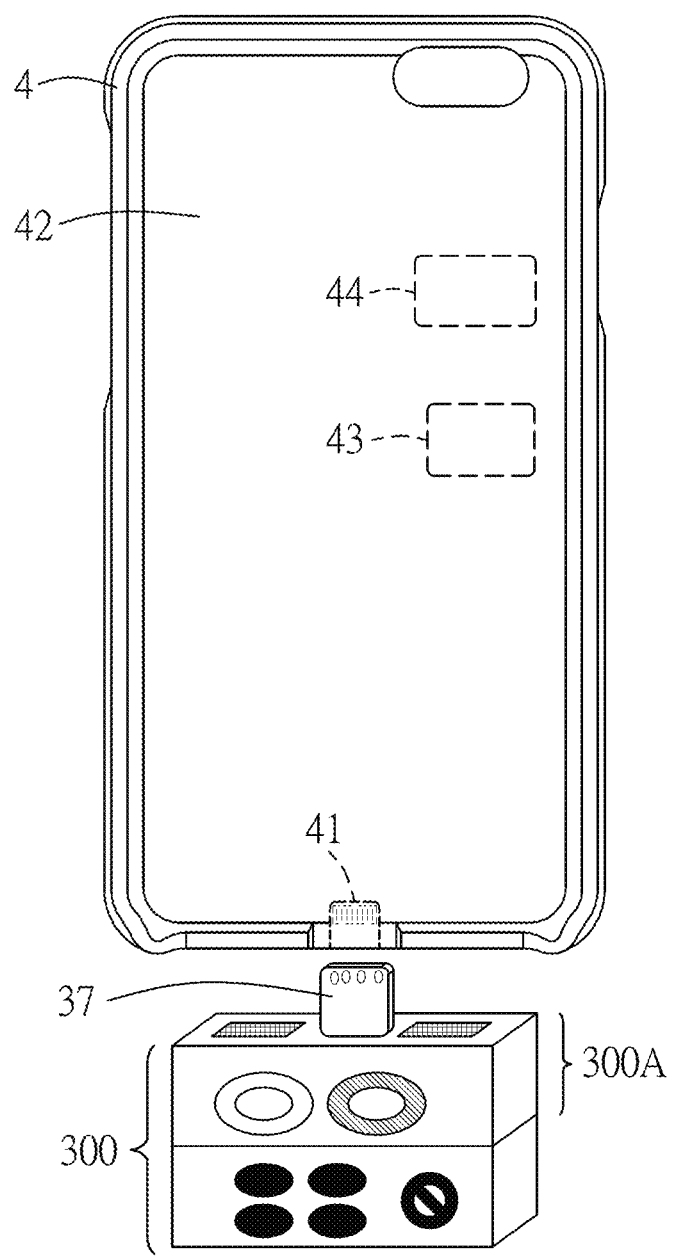
FIGS. 9 and 10 are schematic diagrams illustrating use of the embodiment with a portable device.
Figure 10:
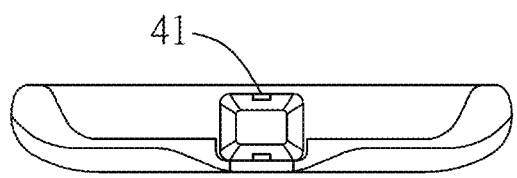

The camera unit 300A may be configured to have a dimension suitable for being attached to a portable device 4 (e.g., a smartphone, a tablet computer, and the like), as shown in FIG. 9. The camera unit 300A may further include a connector 37 (e.g., a male micro/lightning USB connector) mounted to the camera housing 36, so the data of the images captured by the camera unit 300A may be transmitted to the portable device 4 through the connector 37 that is connected to a corresponding connector 41 (e.g., a female micro/lightning USB connector, see FIG. 10) of the portable device 4 for display on a screen 42 of the portable device 4. The camera unit 300A may further include an attaching component 38, which may be realized as one of a hook part and a loop part of a hook-and-loop fastener, a magnet, etc., for enhancing physical connection with the portable device 4 (provided with the other one of the hook part and the loop part of the hook-and-loop fastener, a ferromagnetic material that can be attracted by the magnet, etc., not shown). It is noted that the portable device 4 may require installation of an application 43 and a management tool 44 relating to the camera unit 300A for controlling operation of the camera unit 300A and enabling data transmission between the portable device 4 and the camera unit 300A.

Figure 11:
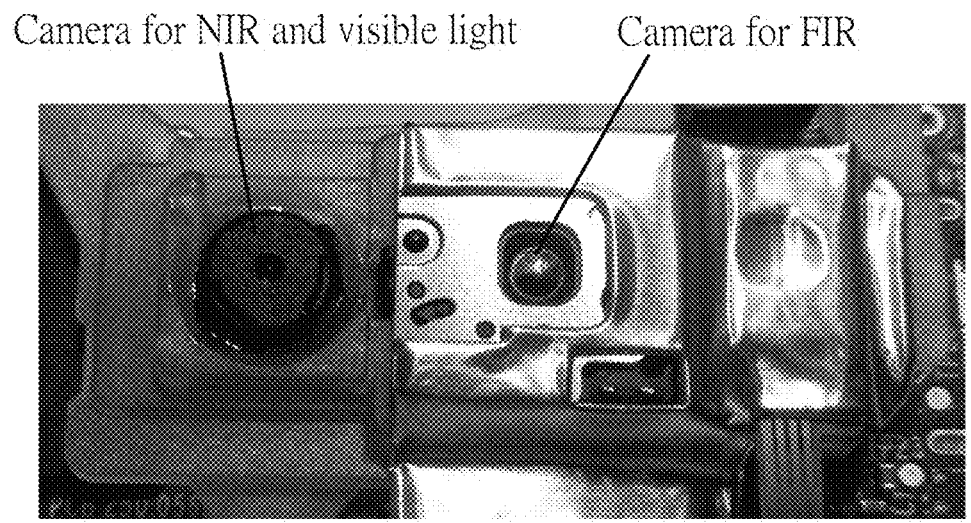
FIGS. 11 and 12 are images illustrating disassembly of the conventional thermographic camera.
Figure 12:
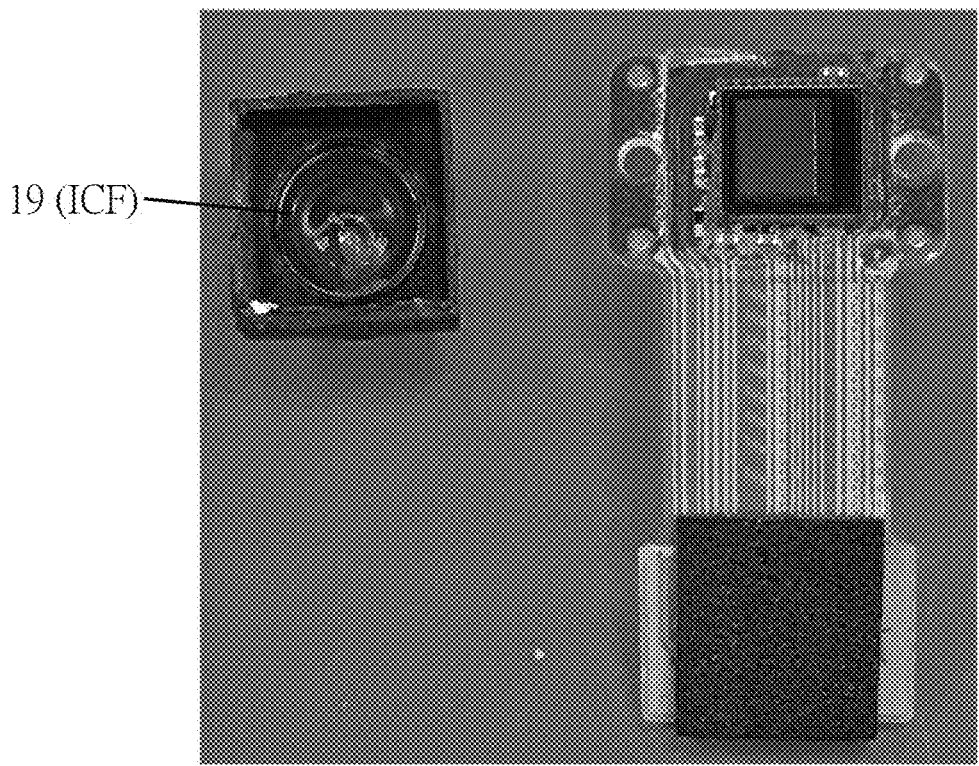

A relatively easy way to obtain the NIR thermal-imaging camera 300 of this embodiment is to acquire a conventional thermographic camera device 100 as shown in FIG. 1 that includes a camera housing 16 to serve as the camera housing 36 in this embodiment, and a camera module mounted to the camera housing 16. The camera module includes a first lens unit 11, a second lens unit 12, an FPA 13, an image sensor 14, and a processor 15 that respectively serve as the first lens unit 31, the second lens unit 32, the FPA 33, the image sensor 34 and the processor 35 in the NIR thermal-imaging camera 300 of this embodiment. The placement, characteristics and functions of the abovementioned components 11-15 are similar to those described for the components 31-35 of the NIR thermal-imaging camera 300 of this embodiment, and details thereof are not repeated herein for the sake of brevity. Differences between the conventional thermographic camera device 100 and the NIR thermal-imaging camera 300 of this embodiment reside in that the conventional thermographic camera device 100 further includes an ICF 19 (see FIG. 1) disposed between the second lens unit 12 and the image sensor 14 to receive the electromagnetic waves passing through the second lens unit 12, and to filter out NIR components from the electromagnetic waves received thereby, so that the electromagnetic waves received by the image sensor 14 (i.e., the electromagnetic waves passing through the ICF 19) has no NIR components or has the NIR components at negligibly low intensities. In order to make the NIR thermal-imaging camera 300 of this embodiment where the image sensor 34 can receive the NIR components of the electromagnetic waves passing through the second lens unit 32, the camera housing 16 is first removed from the camera module of the conventional thermographic camera device 100, and the ICF 19 is subsequently removed from the camera module (see FIGS. 11 and 12). As a result, since nothing exists between the second lens unit 12 (32) and the image sensor 14 (34), the electromagnetic waves received by the image sensor 14 (34) is the same as the electromagnetic waves passing through the second lens unit 12 (32). However, merely removing the ICF 19 may induce an optical path difference which may introduce issues in focusing. To compensate for the optical path difference, a filter component 39 (see FIG. 6) that allows passage of electronic waves in the spectrum of near infrared and that has a shape and a thickness which are substantially identical to those of the ICF 19 can be mounted where the ICF 19 was once located.

Then, the camera housing 16 (36) may be mounted back to the camera module to form the camera unit 300A of the NIR thermal-imaging camera 300 of this embodiment, followed by attaching the NIR source unit 300B to the camera 300A, thereby completing building of the NIR thermal-imaging camera 300.

Figure 14:
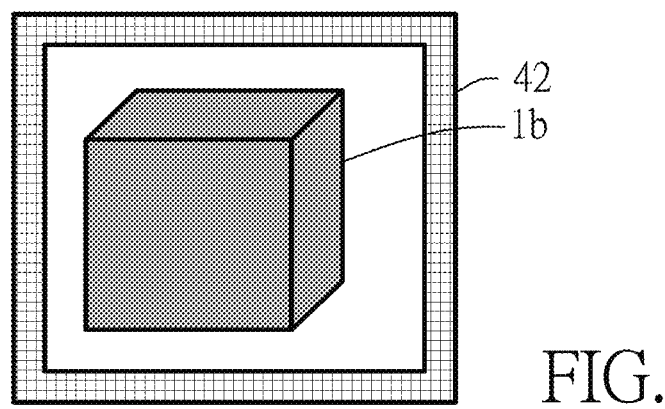
Figure 15:
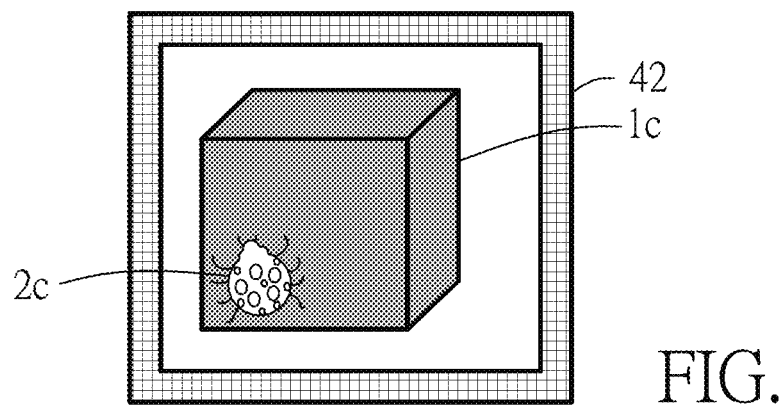
Figure 16:
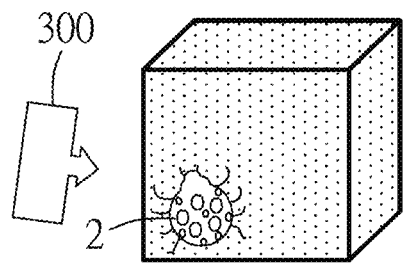
Figure 17:
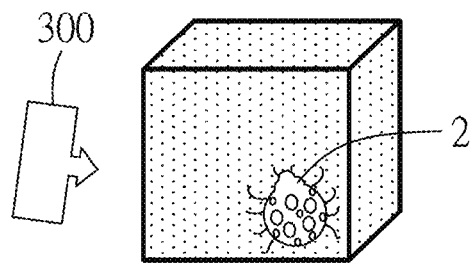

FIG. 13 illustrates the observation box 1 that is used to capture a living target 2 (e.g., a ladybug). FIG. 14 illustrates a result of using an ordinary camera that is able to form images by visible light to capture an image of the observation box 1 that contains the living target 2, and the resultant image can only include an appearance image 1b of the observation box 1. FIG. 15 illustrates a result of using the conventional thermographic camera 100 (see FIG. 1) to capture an image of the observation box 1 that contains the living target 2, and the resultant image may include an appearance image 1c of the observation box 1 and an FIR thermal image 2c (see FIG. 15) that depicts a "thermal projection" of the living target 2 on the outer surface of the observation box 1 when the living target 2 is near the side portion of the observation box 1 (see FIG. 16), because the living target 2 has a body temperature higher than a temperature of the observation box 1, which causes temperature variation on the outer surface of the observation box 1. However, since the FIR thermal image is created based on the surface temperature of the to-be-captured object (i.e., the observation box 1 in this case), the FIR thermal image of the living target 2 may be unclear in the resultant image, or even disappear from the resultant image when the "heat energy" (i.e., the heat radiation, or the FIR radiation) of the living target 2 cannot reach a lower portion of the side portion of the observation box 1 at a sufficient level to result in a temperature difference that is detectable by the FPA on the surface of the side portion (e.g., the living target 2 is dead thus losing its body temperature, or the living target 2 has left the observation box 1, or the living target 2 is at a distance from the side portion of the observation box 1 as shown in FIG. 17). When the thermal image of the living target 2 does not appear in the resultant image, the observer will not know what actually happens inside the observation box 1. The observer may need to move the observation box 1 to confirm the situation (e.g., whether the living target 2 is still alive, or a position of the living target 2, etc.); however, this action may bother or scare the living target 2, and thus adversely affect the observation.

Figure 18:
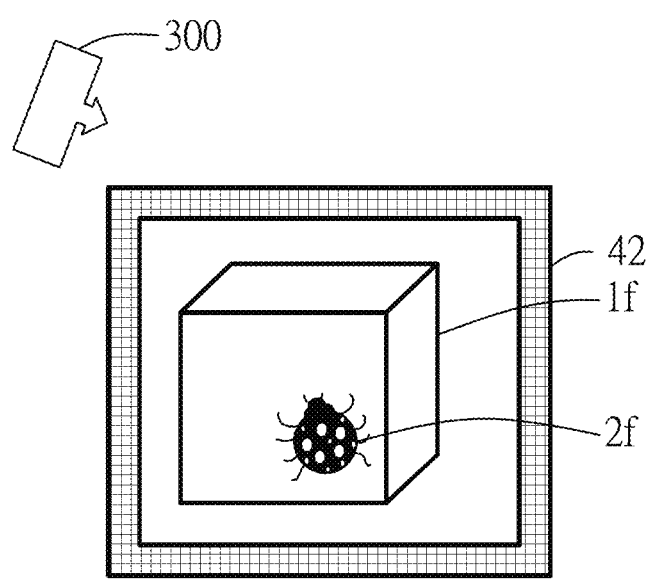

Referring to FIGS. 6 and 18, the NIR thermal-imaging camera 300 may solve or alleviate the abovementioned problems that may also occur in images taken by the combination of the first lens unit 31 and the FPA 33 of the NIR thermal-imaging camera 300. The NIR component which is included in the sunlight and which passes through the observation box 1 is reflected by the living target 2 to enter the NIR thermal-imaging camera 300 through the second lens unit 32, passes through the filter component 39, and reaches the image sensor 34 to form an NIR image that makes the details of the living target 2 clearer in the fusion image, as shown FIG. 18, where the NIR image shows a transparent box 1f corresponding to the observation box 1, and a living target image 2f. Accordingly, the observer may become aware of a current condition of the living target 2 when presented with the NIR image in the fusion image, and does not have to move the observation box 1.

In a case that the sunlight is not strong enough, the observer may turn on the NIR source unit 300B (see FIG. 7) to project near infrared toward the living target 2 through the observation box 1, such that the second lens unit 32 receives the near infrared reflected by the living target 2 and passing through the observation box 1, thereby assisting in forming a clearer NIR image in the fusion image.

Figure 19:
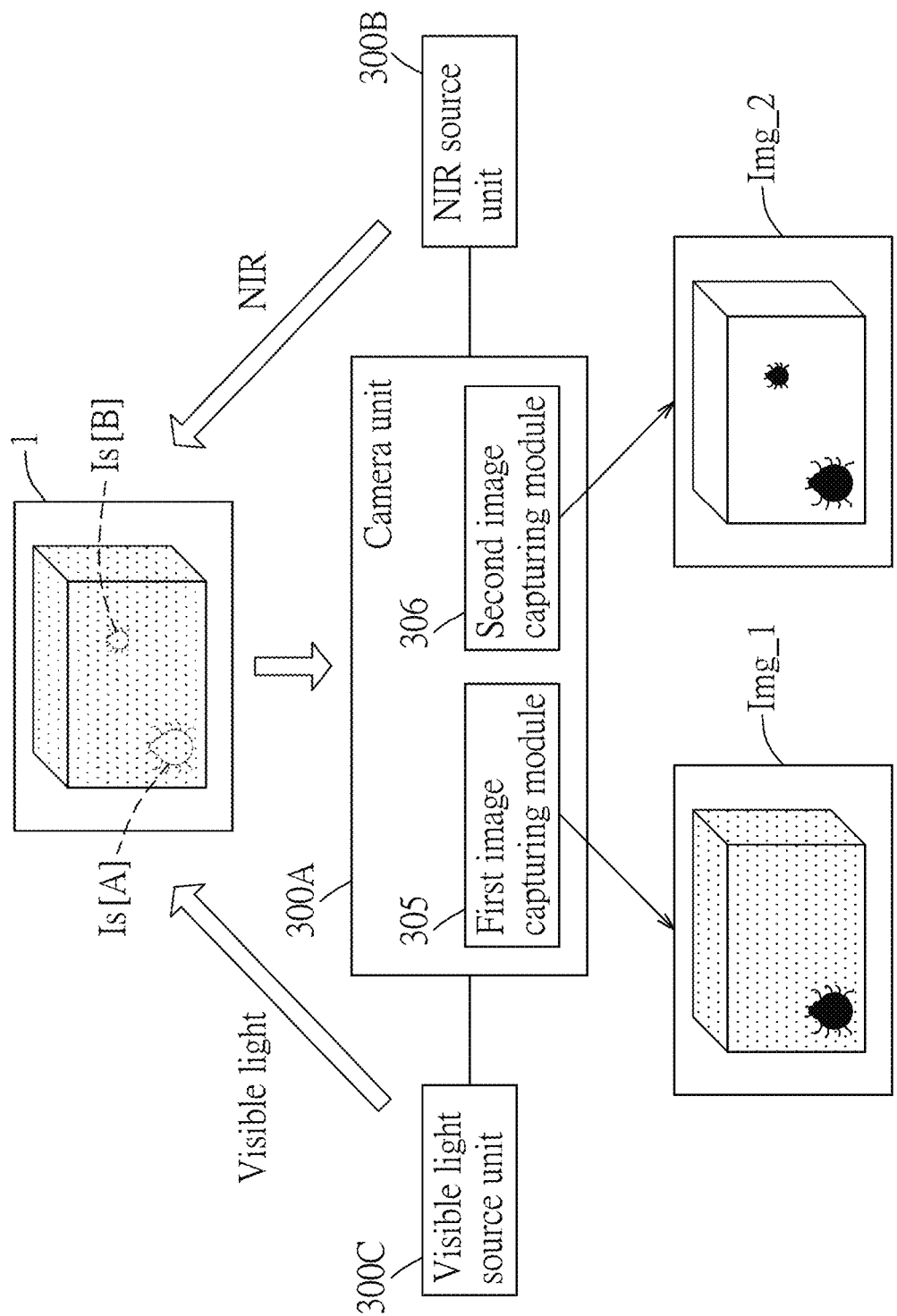
FIG. 19 is a schematic diagram illustrating application of the embodiment.

Referring to FIG. 19, the NIR thermal-imaging camera 300 may include both of the NIR source unit 300B and a visible light source unit 300C to respectively project near infrared and visible light toward the observation box 1. In FIG. 19, two insects Is[A] and Is[B] are inside the observation box 1, where the insect Is[A] is close to a front wall of the observation box 1, while the insect Is[B] is away from the front wall. An image Img_1 obtained by the first image capturing module 305 may show an opaque observation box of which the front wall has a pattern that represents temperature distribution of the insect Is[A], while the insect Is[B] may not be shown in the image because a distance between the insect Is[B] and the front wall is too far for the heat of the insect Is[B] to reach the front wall by heat conduction. On the other hand, an image Img_2 obtained by the second image capturing module 306 would clearly show both the insects Is[A] and Is[B] in the transparent observation box because near infrared, which is projected by the NIR source unit 300B, can pass through the observation box 1.

Figure 3:
FIGS. 3-5 include multiple FIR thermal images captured by the conventional thermographic camera.
Figure 4:
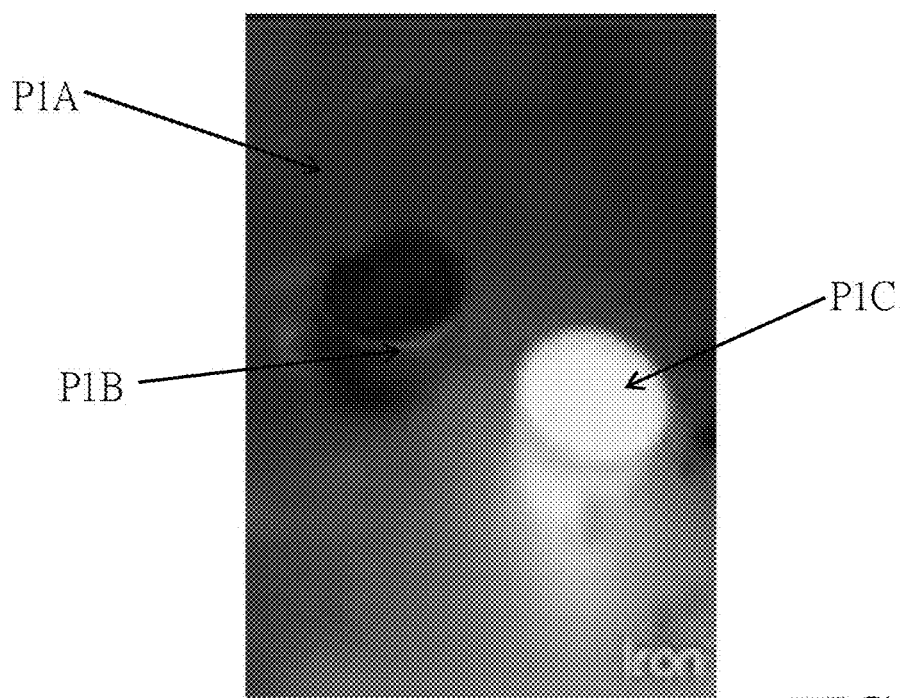
Figure 5:
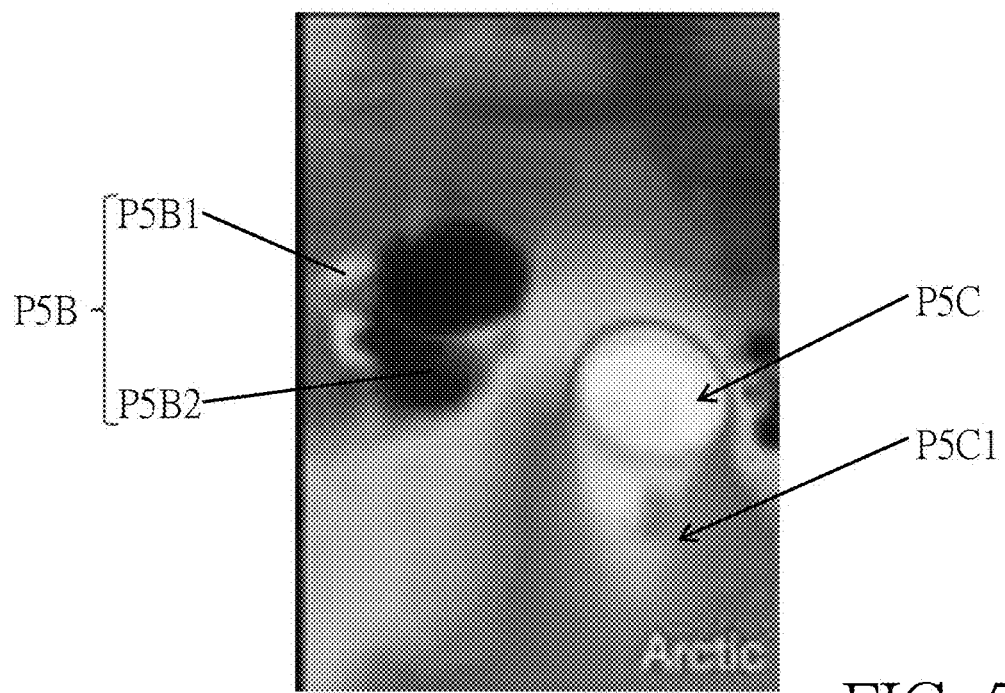
Figure 20:
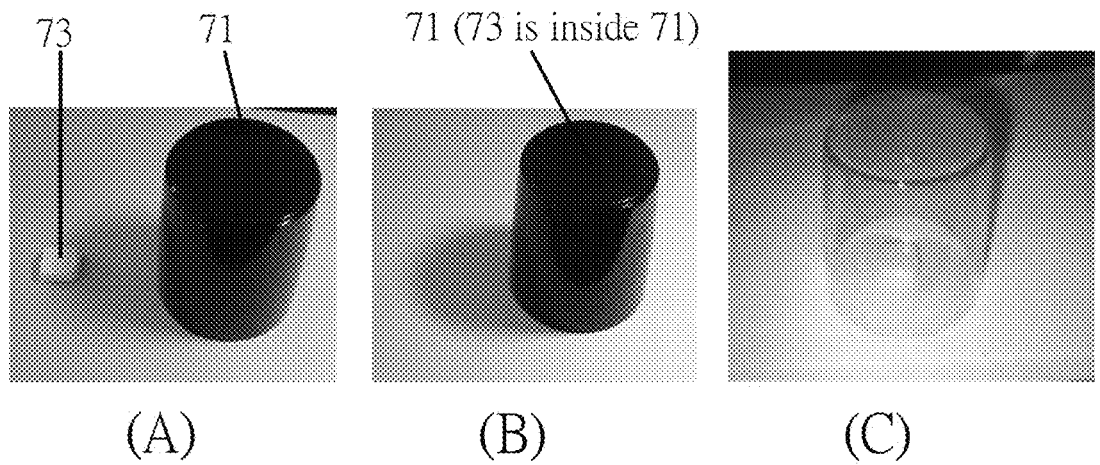
FIGS. 20 and 21 are images illustrating effects of the embodiment in comparison with the conventional thermographic camera.
Figure 21:
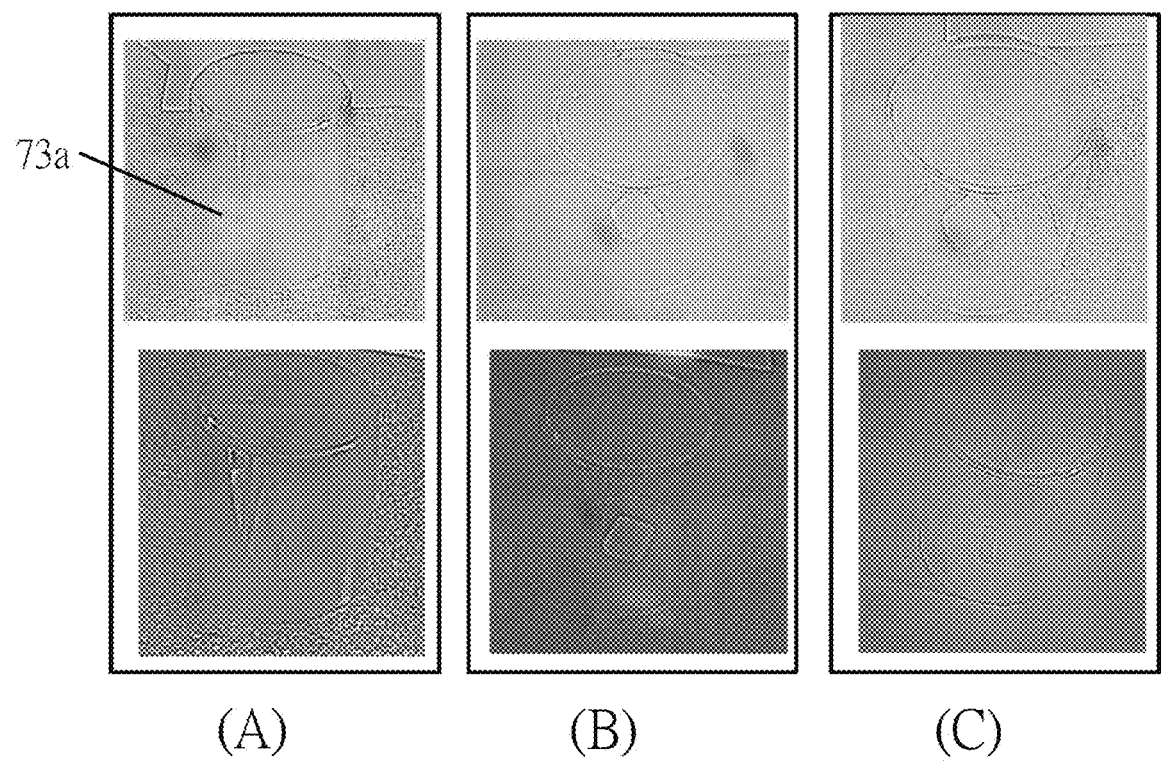

Referring to FIGS. 7, 20 and 21, a black cup 71 and a white block 73 (see part (A) of FIG. 20) are used to verify the imaging effect of the NIR thermal-imaging camera 300. The black cup 71 is used to cover the white block 73 on a tabletop (see part (B) of FIG. 20), thereby forming a target object to be observed, and the NIR thermal-imaging camera 300 is used to capture images of the target object. Part (C) of FIG. 20 shows a pure NIR image of the target object captured by the NIR thermal-imaging camera 300 with the NIR source unit 300B turned on to enhance clarity of the NIR image. It can be seen from part (C) of FIG. 20 that, in the NIR image, the black cup 71 becomes transparent, and the edges of both the black cup 71 and the white block 73 are clear. Part (A) of FIG. 21 includes two fusion images that are obtained using the conventional thermographic camera 100 (see FIG. 1), where the upper image and the lower image are respectively generated using the pseudo color modes P1, P2, which are exemplified in FIG. 3. In part (A) of FIG. 21, the appearance of the white block 73, such as a shape of the white block 73, can hardly be discerned, and only some temperature difference (referenced by a numeral 73a), which may result from transfer of temperature onto the target object from fingers of an operator who placed the white block 73 on the tabletop, can be seen. Part (B) of FIG. 21 includes two fusion images that are captured using the NIR thermal-imaging camera 300 (see FIG. 7) with the NIR source unit 300B turned off, where the upper image and the lower image are respectively generated using the pseudo color modes P1, P2. It is apparent that the image of the white block 73 in part (B) of FIG. 21 is clearer in comparison to part (A) of FIG. 21. Part (C) of FIG. 21 includes two fusion images that are captured using the NIP thermal-imaging camera 300 with the NIP source unit 300B turned on, where the upper image and the lower image are respectively generated using the pseudo color modes P1, P2. In part (C) of FIG. 21, the contours of both the black cup 71 and the white block 73 are even clearer as compared to part (B) of FIG. 21.

In another exemplary application, the NIR thermal-imaging camera 300 may be used in an international airport at immigration inspection, so as to check whether a traveler is getting a fever while the facial features of the traveler can be identified at the same time. Although some travelers may wear sunglasses, the electromagnetic waves of NIR that are reflected by the traveler can still pass through the sunglasses, so that the image taken by the NIR thermal-imaging camera 300 can still show the facial features of the traveler.

In an exemplary application of security control, the NIR thermal-imaging camera 300 may be used to detect dangerous articles which may be hidden in an opaque container (e.g., an opaque bag, an opaque box, etc.) and which may have a temperature different from the room temperature. By using a conventional thermographic camera or the conventional thermographic camera 100, the captured image may only show that there is an object having a different temperature in the opaque container. However, images taken by the NIR thermal-imaging camera 300 of this disclosure may show the contours or edges of the object therein, so that the object may be identified.

In the description above, for the purposes of explanation, numerous specific details have been set forth in order to provide a thorough understanding of the embodiment (s) It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A system for observing nocturnal activities and temperature variation of a living target during daytime, said system comprising:
   an observation box that allows passage of near infrared, that blocks passage of visible light;
   a living target disposed within and covered by said observation box;
   an imaging device that includes:

a first image capturing module including a focal plane array (FPA) that is sensitive to far infrared (FIR) resulting from heat energy of objects, wherein said first image capturing module is disposed to capture a first image, which is a thermal image resulting from far infrared emitted by an outer surface of said observation box, said outer surface of said observation box having a temperature distribution that relates to the living target covered by said observation box, wherein a spectrum of far infrared ranges between 8 µm and 14 µm in terms of wavelength; and a second image capturing module including a filter component that is configured to permit passage of only visible light and light components of which wavelengths fall within a specific range of near infrared, and an image sensor that is sensitive to visible light and near infrared (NIR), wherein said second image capturing module is configured to make said image sensor receive visible light and near infrared that enter said second image capturing module and that pass through said filter component, and is disposed to capture a second image including a first image component and a second image component; wherein the first image component results from visible light that passes through said filter component, and relates to an outer appearance of said observation box; wherein the second image component results from near infrared that passes through said filter component, and relates to the living target covered by said observation box; wherein a spectrum of visible light ranges between 0.4 µm and 0.7 µm in terms of wavelength, a spectrum of near infrared ranges between 0.7 µm and 1 µm in terms of wavelength, and the specific range of near infrared is selected from the group consisting of a range from 830 nm to 870 nm, a range from 920 nm to 960 nm, and a combination thereof; and an NIR source unit disposed to project near infrared that falls within the specific range of near infrared toward said observation box that covers the living target for enhancing near infrared reflected by the living target, such that the near infrared projected by said NIR source unit passes through said observation box, and is reflected by the living target toward said second image capturing module to form the second image component of the second image, said NIR source unit including a dimmer that is operable to adjust an intensity of near infrared projected by said NIR source unit, so as to change a ratio of intensity of visible light that enters said second image capturing module to intensity of near infrared that enters said second image capturing module.

2. The system of claim 1, wherein the living target includes a nocturnal animal.

3. The system of claim 1, wherein the living target includes a nocturnal insect.

4. The system of claim 1, wherein the second image component becomes clearer in the second image when said dimmer is operated to increase an intensity of near infrared projected by said NIR source unit.

5. The system of claim 1, wherein said imaging device further includes a processor configured to perform image fusion on the first and second images to generate a fusion image that shows the temperature distribution of said outer surface of said observation box, and the living target in said observation box.

* * * * *